W. KRAFVE.
INTAKE MANIFOLD.
APPLICATION FILED DEC. 31, 1920.

1,431,121.  Patented Oct. 3, 1922.

INVENTOR.
William Krafve.
BY Joseph H. Miller
ATTORNEY

Patented Oct. 3, 1922.

1,431,121

UNITED STATES PATENT OFFICE.

WILLIAM KRAFVE, OF OAKHAM, MASSACHUSETTS.

INTAKE MANIFOLD.

Application filed December 31, 1920. Serial No. 434,322.

*To all whom it may concern:*

Be it known that I, WILLIAM KRAFVE, a citizen of the United States, residing at Oakham, in the county of Worcester and State of Massachusetts, have invented new and useful Improvements in Intake Manifolds, of which the following is a specification.

This invention relates to certain new and useful improvements in intake manifolds, and the primary object thereof is to provide a manifold which is constructed so as to effect a more perfect commingling of the gas and air after leaving the carbureter and prior to entry into the engine.

In addition, the invention proposes to provide a manifold which has a large and effective heating surface, to thus assure of high heating of the mixture prior to its entry into the engine.

Still further, the invention aims to provide a mixing chamber which will be compact and occupy but little room.

Briefly, the invention proposes an intake manifold which consists of two flat plates each of relatively large area, and connected together so as to leave a very narrow space between the inner or confronting faces thereof, the plates being of somewhat triangular form with the carbureter inlet at the apices thereof and the outlets to the engine at the base of the triangular plates or upper corners of the said plates, so as to cause the mixture of air and gaseous fluid to be thrown into close and intimate contact while passing from the inlet to the outlet of the manifold, thereby to assure of a more perfect mixture prior to the latter entering the engine cylinders.

Figure 1:
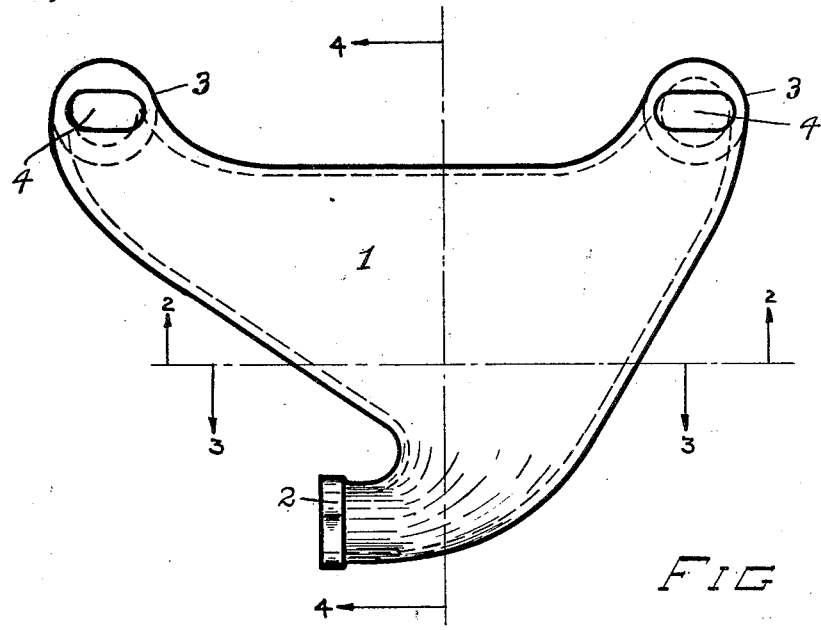
Fig. 1, is a side elevation of the invention.
Figure 2:
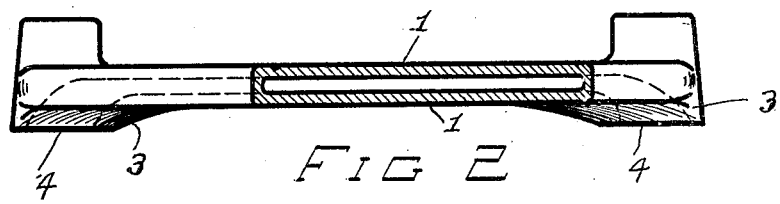
Fig. 2, is a section on line 2—2 of Fig. 1.
Figure 4:
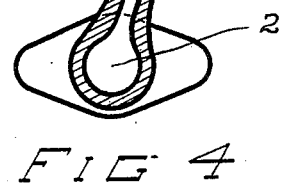
Fig. 4, is a similar view on line 4—4 of Fig. 1.
Figure 3:
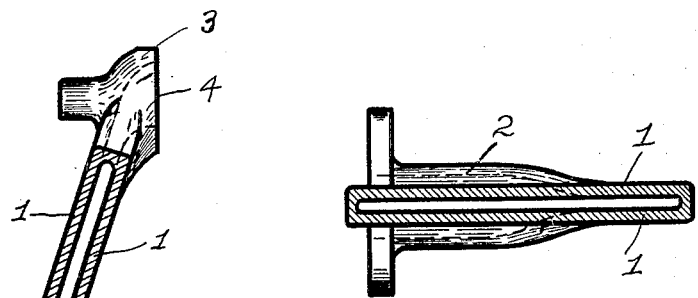
Fig. 3, is a similar view on line 3—3 of Fig. 1.

In proceeding in accordance with the present invention, a casting is preferably employed and formed to provide a pair of similar and substantially triangular flat plates 1, which are arranged in parallelism to form a very narrow mixing chamber. At the apex of the plates there is formed a flared or enlarged substantially circular inlet connection 2, which is designed to be connected to the carbureter in the usual manner. Each of the corners of the chamber is formed with an outlet 3, for connection with the engine, the outlets being formed with approximately elliptical mouths 4, as depicted in Fig. 1, of the drawings. These mouths as is apparent, are disposed at right angles to the longitudinal axis of the inlet 2, so that the mixture exits accordingly as compared with its plane of entry.

One of the important features of the invention, is the large heat surfaces or areas which are provided by the large triangular plates, which latter when heated by the engine, or from any outside source, if desired, will radiate the heat accordingly to thus effect high and complete heating of the mixture prior to its entry into the engine. Second, the plates being located close together provide a constricted mixing chamber, thereby throwing the gaseous fluid and the air into close and intimate contact so that the two are forced to combine prior to egressing into the engine.

In addition a more substantial and compact structure is provided, since the plates being but narrowly spaced mutually brace one another, and will lie alongside the engine so as to occupy but little room.

Having thus described my invention, what I claim as new and desired to secure by Letters Patent is:

In an intake manifold, a body formed to have a pair of substantially similar and triangular flat plate-like parts connected along their edges to form a mixing chamber of narrow width, the apex of the body being formed to have a circular inlet arranged to extend in the plane of the plate-like parts, the diameter thereof being greater than the distance between said plate-like parts.

In testimony whereof I have signed my name to this specification in the presence of two subscribing witnesses.

WILLIAM KRAFVE.

Witnesses:
 MARION A. KINGSLEY,
 J. A. MILLER.